(12) United States Patent  
Shimanuki

(10) Patent No.: US 6,708,913 B2
(45) Date of Patent: Mar. 23, 2004

(54) MAGNETIC TAPE UNIT

(75) Inventor: Hiroyuki Shimanuki, Yonezawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/189,500

(22) Filed: Jul. 8, 2002

(65) Prior Publication Data

US 2003/0015615 A1 Jan. 23, 2003

(30) Foreign Application Priority Data

Jul. 17, 2001 (JP) .......................................... 2001-217079

(51) Int. Cl.[7] .............................................. G11B 15/66
(52) U.S. Cl. ...................................... 242/332.4; 360/95
(58) Field of Search .......................... 242/332.4, 332.5, 242/532.7, 587.1; 360/95

(56) References Cited

U.S. PATENT DOCUMENTS

| | | | | |
|---|---|---|---|---|
| 4,679,747 A | * | 7/1987 | Smith ........................ | 242/332.4 |
| 4,709,873 A | * | 12/1987 | Smith et al. .............. | 242/332.8 |
| 4,742,407 A | * | 5/1988 | Smith et al. .............. | 242/332.4 |
| 5,128,814 A | * | 7/1992 | Morimoto ................... | 360/85 |
| 5,219,129 A | * | 6/1993 | Spicer et al. ............ | 242/332.1 |
| 5,542,620 A | * | 8/1996 | Ohshita .................... | 242/332.4 |
| 6,513,744 B2 | * | 2/2003 | Suzuki ..................... | 242/332.4 |

FOREIGN PATENT DOCUMENTS

JP 2000-16108 1/2000

* cited by examiner

Primary Examiner—Kathy Matecki
Assistant Examiner—Evan Langdon
(74) Attorney, Agent, or Firm—Young & Thompson

(57) ABSTRACT

The magnetic tape unit comprises a take-up reel for winding a magnetic tape thereon, a threader pin from which a leader block connected to a front end of the magnetic tape housed in a cartridge is suspended, a threader arm to which the threader pin is attached in order to lead the leader block from the tape exit of the cartridge up to the inside of the take-up reel by leading the threader pin from the tape exit of the cartridge up to the rotation center of the take-up reel, and an elastic body for restricting the play of the position of the threader arm by an elastic force so that the threader pin present at the rotation center of the take-up reel does not shift from the rotation center.

10 Claims, 6 Drawing Sheets

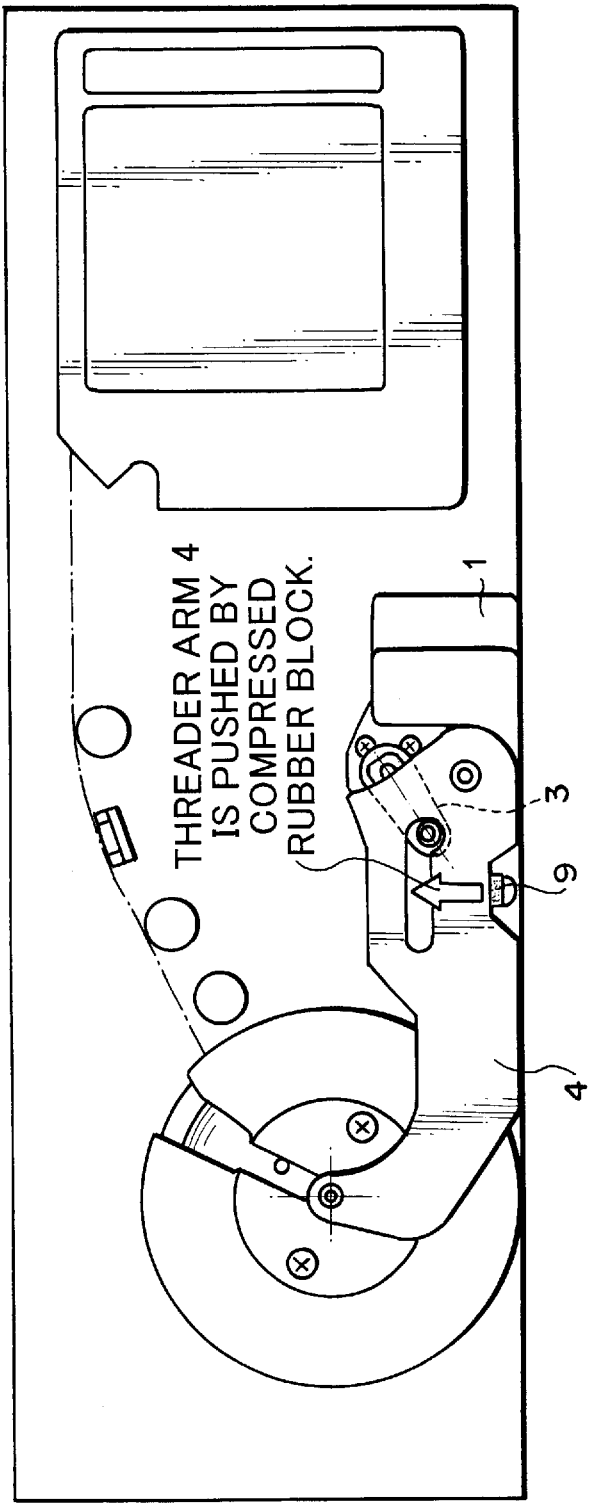
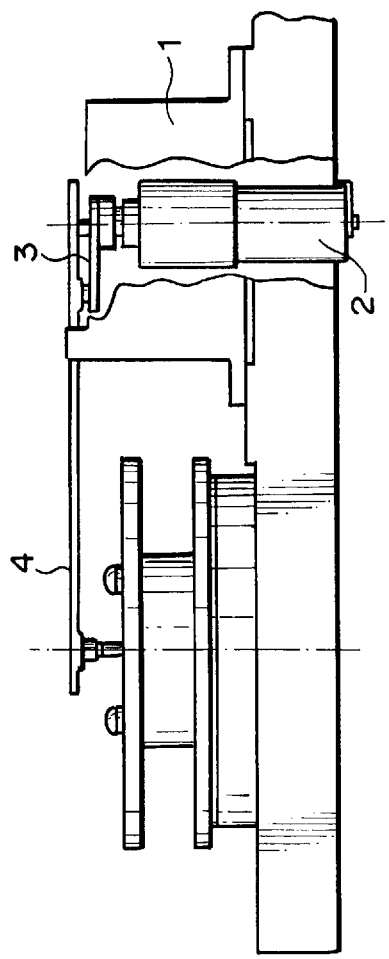
FIG.3A
FIG.3B

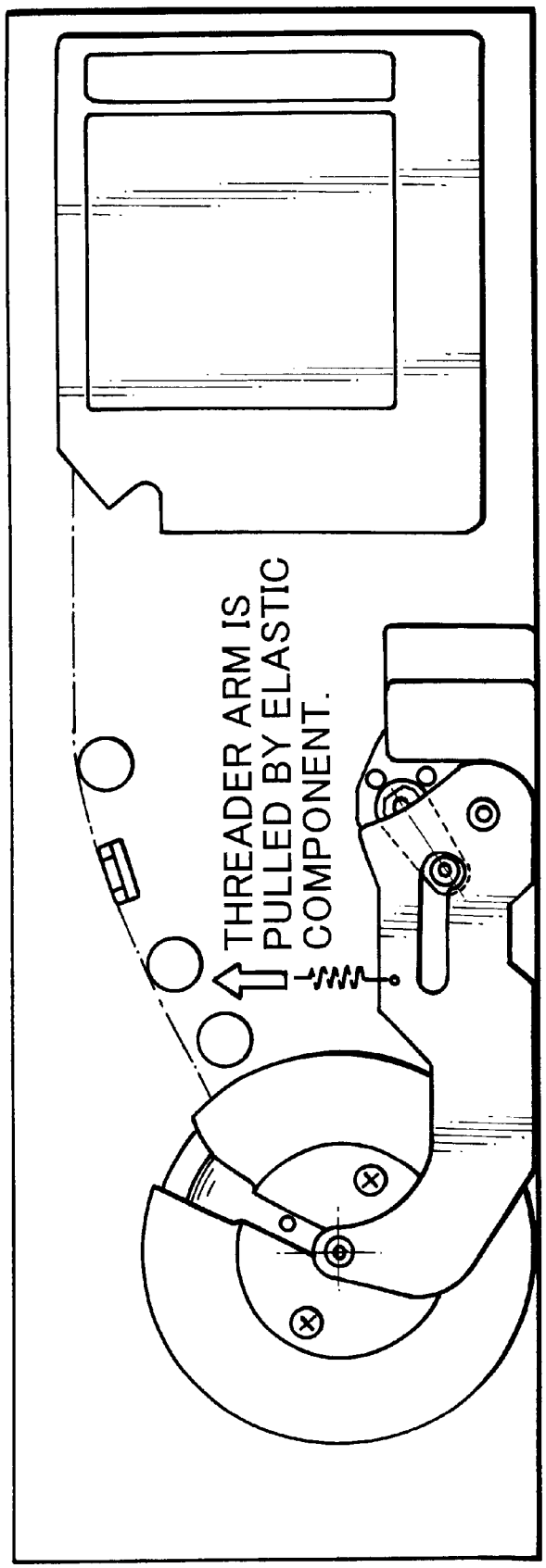

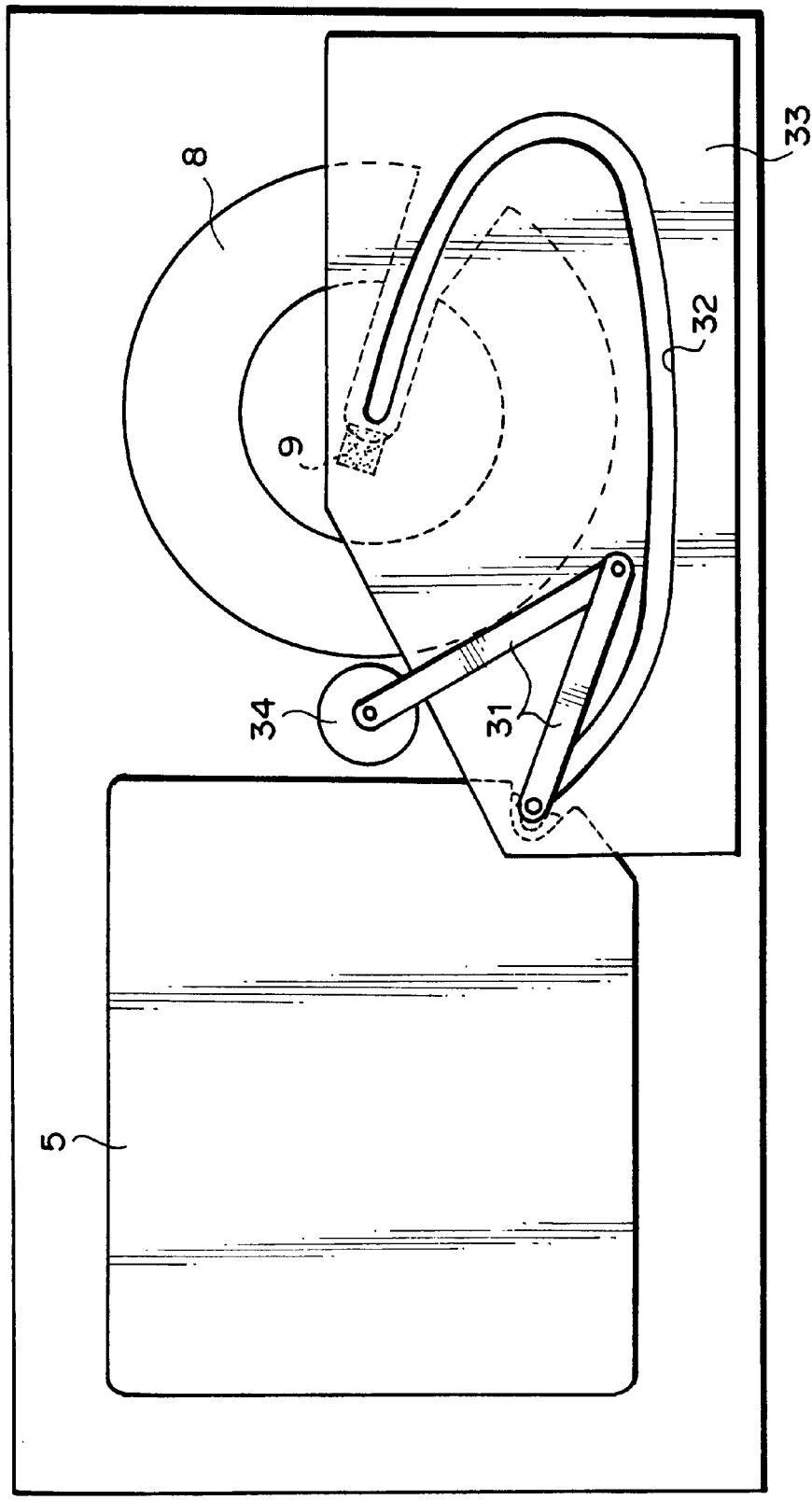

MAGNETIC TAPE UNIT

BACKGROUND OF THE INVENTION

1. Field of the Invention

The present invention relates to a magnetic tape unit for writing information on a magnetic tape or reading the information from the magnetic tape.

2. Description of the Related Art

FIGS. 1A and 1B shows a conventional magnetic tape unit.

Referring to FIGS. 1A and 1B, the conventional magnetic tape unit is provided with a take-up reel 8 for winding a magnetic tape thereon by rotating about a rotation center 12, a threader pin 11 from which a leader block 7 connected to the front end of a magnetic tape 6 housed in a cartridge 5 is suspended, a threader arm 4 for leading the leader block 7 from a tape exit 15 of the cartridge 5 up to an inside 16 of the take-up reel 8 by leading the threader pin 11 from the tape exit 15 of the cartridge 5 up to the rotation center 12 of the take-up reel 8, and a motor 2 for driving the threader arm 4. Moreover, the threader arm 4 is driven by the motor 2 through a driving arm 3.

Reference numeral 13 denotes a rotating shaft of the motor, which also serves as a rotating shaft of the driving arm 3. Reference numeral 14 denotes a rotating shaft of the threader arm 4. Therefore, the motor 2 and driving arm 3 rotate about the rotating shaft 13 and the threader arm 4 rotates about the rotating shaft 14 in accordance with the contact between a pin 17 provided to the driving arm 3 and a groove 18 provided to the threader arm 4.

A rotary encoder (not illustrated) is set to the rotating shaft 14 of the threader arm and position sensors (not illustrated) are set to positions nearly reaching two of the stop positions of the threader arm 4. The two stop positions are the position where the threader arm 4 holds the leader block 7 housed in the cartridge 5 and the position where the threader arm 4 is set to the rotation center 12 of the take-up reel 8. A motor driving circuit (not illustrated) controls the position and speed of the threader pin 11 by controlling the angle and angular speed of the motor on the basis of the rotary encoder and these two position sensors.

In the case of the above magnetic tape unit, the position of the threader arm 4 is indeterminate due to the backlash of each operating portion of a threader mechanism and the center of the threader pin 11 may be shifted from the rotation center 12 of a machine reel after the threader pin 11 set to the threader arm 4 carries the leader block 7 set to the front end of the magnetic tape 6, the leader block 7 is set in the take-up reel 8, and the threading operation is completed. When running the magnetic tape 6 under the above state, a threader mechanism vibrates due to the backlash.

When the position of a threader arm is indeterminate due to the backlash of each operating portion of the threader mechanism, the center of the threader pin 11 set to the threader arm 4 may be shifted from the rotation center 12 of the take-up reel. When running a tape in the above state, the threader pin 11 interferes with the leader block 7 and the threader mechanism may vibrate.

SUMMARY OF THE INVENTION

The present invention is made to solve the above problems and its object is to provide a magnetic tape unit capable of preventing a threader pin from shifting from the rotation center of a take-up reel while the magnetic tape unit operates.

According to the present invention, there is provided a magnetic tape unit comprising: a take-up reel for winding a magnetic tape thereon; a threader pin from which a leader block connected to a front end of the magnetic tape housed in a cartridge is suspended; a threader arm to which the threader pin is attached in order to lead the leader block from a tape exit of the cartridge up to an inside of the take-up reel by leading the threader pin from the tape exit of the cartridge up to the rotation center of the take-up reel; and an elastic body for restricting the backlash of the position of the threader arm by an elastic force so that the threader pin present at the rotation center of the take-up reel does not shift from the rotation center.

In the magnetic tape unit, the elastic force may be pressure.

In the magnetic tape unit, the elastic force may be tension.

In the magnetic tape unit, the elastic body may be selected from the group consisting of a rubber block, a compression coil spring, a tensile coil spring, a leaf spring, a torsion coil spring, and a resin block.

The magnetic tape unit may further comprise driving means for driving the threader arm.

In the magnetic tape unit, the threader arm may be driven by the motor through a driving arm.

BRIEF DESCRIPTION OF THE DRAWINGS

FIG. 3A is a plan view of the magnetic tape unit in FIGS. 2A and 2B where the unit is kept in a threaded state;

FIG. 3B is a side view of the magnetic tape unit in FIGS. 2A and 2B where the unit is kept in the threaded state;

FIG. 4 is a plan view showing a structure of a magnetic tape unit according to another embodiment of the present invention;

FIG. 5 is a plan view showing a structure of a magnetic tape unit according to still another embodiment of the present invention;

DETAILED DESCRIPTION OF THE PREFERRED EMBODIMENTS

Figure 1A:
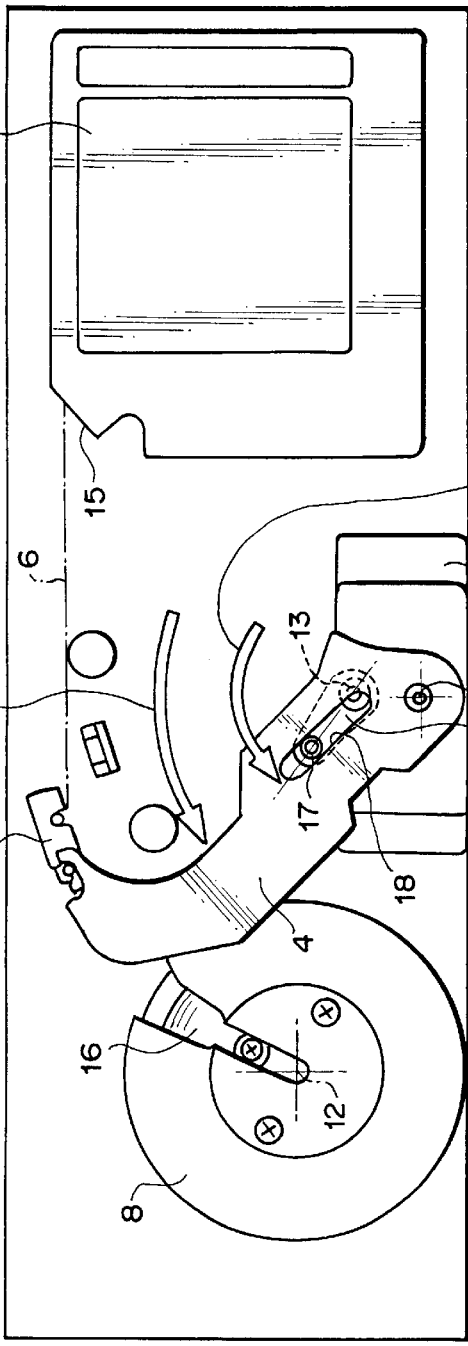
FIG. 1A is a plan view showing a structure of a conventional magnetic tape unit.
Figure 1B:
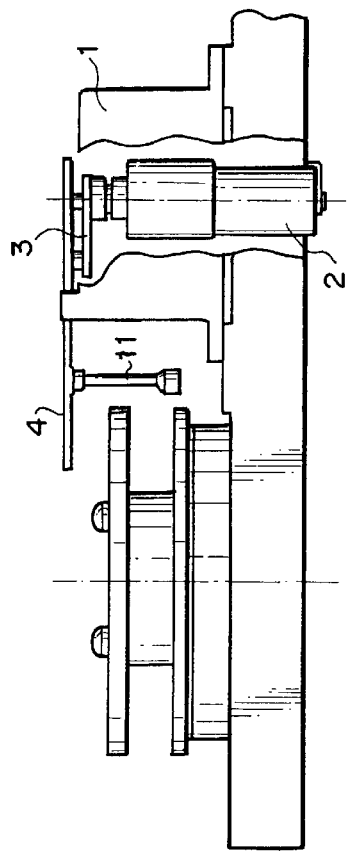
FIG. 1B is a side view showing a structure of the conventional magnetic tape unit.
Figure 2A:
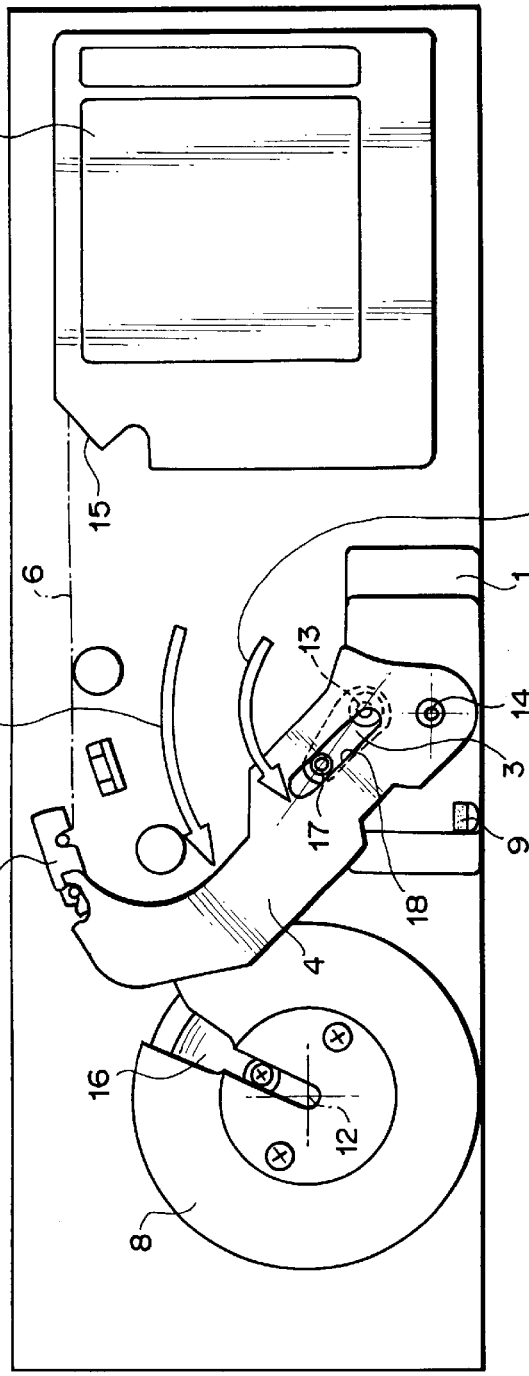
FIG. 2A is a plan view showing a structure of a magnetic tape unit according to an embodiment of the present invention.
Figure 2B:
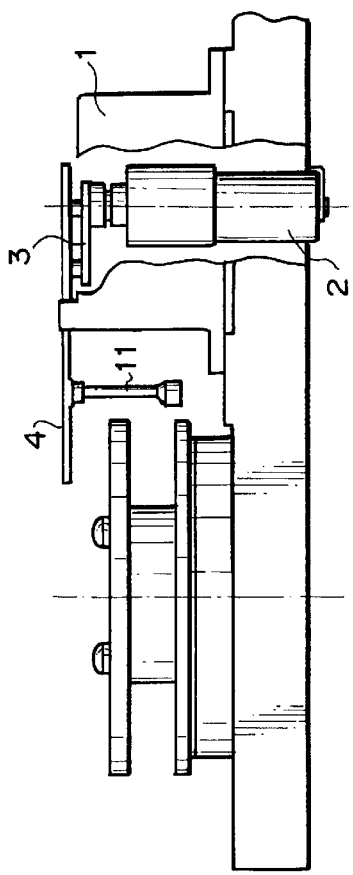
FIG. 2B is a side view showing a structure of the magnetic tape unit according to the embodiment of the present invention.

As shown in FIGS. 2A and 2B, in a tape drive of a magnetic tape unit in which a magnetic tape 6 is extended from a cartridge 5 by a threader mechanism and the extended magnetic tape 6 is wound on a take-up reel 8, the threader mechanism comprises a threader base 1, a motor 2, a driving arm 3 set to the motor 2, a threader arm 4 to be driven by the rotation of the driving arm 3, and a rubber block 9 set on the threader base 1.

As shown in FIGS. 3A and 3B, when the threader mechanism is kept in a threaded state, the rubber block 9 is compressed by being held between the threader base 1 and threader arm 4.

As shown FIGS. 2A and 2B, the driving arm 3 is rotated by the motor 2 and the threader arm 4 is driven in accordance with the rotation of the driving arm 3. Thereby, the threader arm 4 takes out a leader block 7 set at an end of the magnetic tape 6 from the cartridge 5 and the threader arm 4 carries the leader block 7 up to the take-up reel 8. Thus, the threaded state is realized as shown in FIGS. 3A and 3B. When the threader mechanism is kept in a threaded state, the rubber block 9 is compressed by being held between the threader base 1 and threader arm 4. Because the compressed rubber block 9 pushes the threader arm 4, a backlash of the rotating shaft of the motor 2 and the backlash between the driving arm 3 and threader arm 4 are removed and the threader arm 4 which is otherwise indeterminate by the backlash stays at a fixed position.

The rubber block 9 is an example of elastic components. As an elastic component, it is allowed to use any one of a compression coil spring, tensile coil spring, leaf spring, torsion coil spring, resin block and the like instead of the rubber block.

In the case of the above embodiment, positioning is performed when the compressed elastic component pushes the threader arm. However, it is also allowed to use a structure of performing positioning by setting the elastic component to a position opposite to that of rubber block 9 with respect to the threader arm, that is, a position opposite to the case of the above embodiment and pulling the threader arm by the elastic component as shown in FIG. 4. Also in this case, it is possible to use any one of a rubber block, compression coil spring, tensile coil spring, lead spring, torsion coil spring, resin block and the like as the elastic component.

Moreover, the threading mechanism of the above embodiment uses a mechanism in which a driving arm rotated by a motor drives a threader arm to carry a leader block set to the front end of a magnetic tape. As shown in FIG. 5, however, it is also possible to apply the embodiment to a threader mechanism in which a motor 34 drives a threader arm 31 connected by joints and a part of the arm is guided by a guide groove 32 formed on a guide plate 33. In this case, the threader arm 31 is pulled by the motor 34 having a rotation angle in a threaded state. However, because the threader arm is pushed by the elastic force of the elastic body such as the rubber block 9 in the direction opposite to the direction in which the arm 31 is pulled by the motor 34, the position of the threader arm is not shifted.

Figure 6A:
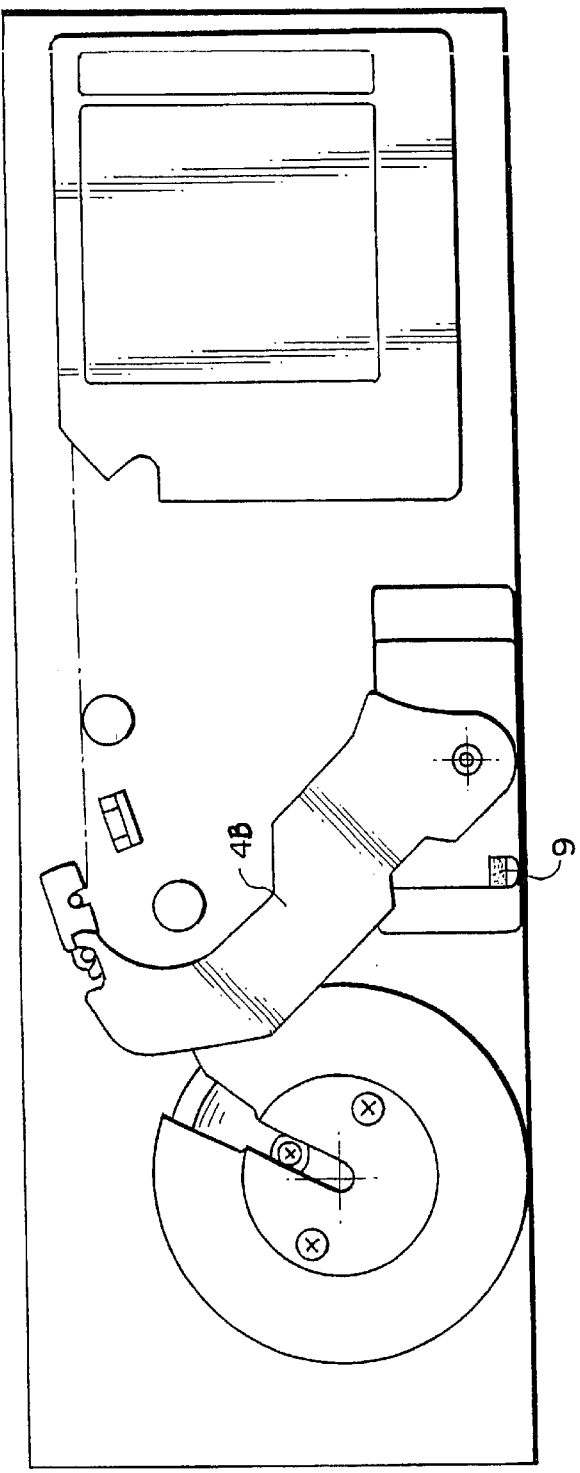
FIG. 6A is a plan view showing a structure of a magnetic tape unit of still another embodiment of the present invention.
Figure 6B:
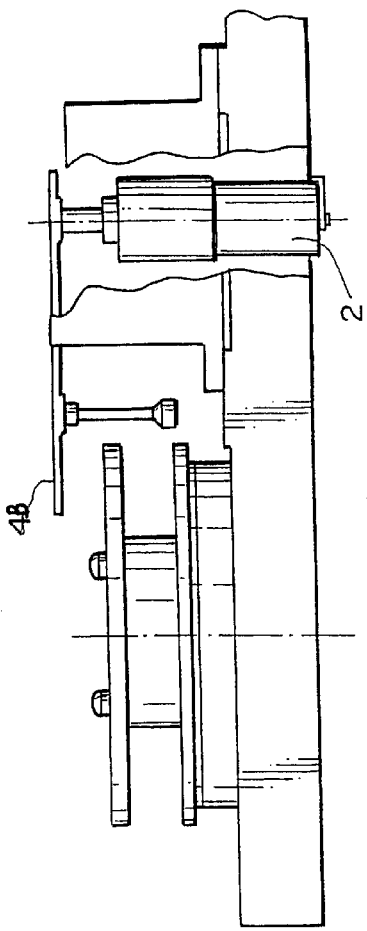
FIG. 6B is a side view showing a structure of the magnetic tape unit of the still another embodiment of the present invention.

Furthermore, in the case of the threading mechanism of the above embodiment, the threader arm 4 is driven by the motor 2 through the driving arm 3. However, it is also possible to prevent the position of a threader arm 4B from being shifted by an elastic body such as the rubber block 9 in a mechanism in which the threader arm 4B is directly set to the rotating shaft of the motor 2 as shown in FIGS. 6A and 6B to directly drive the threader arm 4B by the motor 2.

As described above, according to the present invention, when threading is completed in the threader mechanism of the tape drive of the magnetic tape unit, the threader pin 11 stays at a fixed position without backlashing. As a result, it is possible to prevent the threader mechanism from vibrating while a tape runs. By keeping the threader pin 11 at a fixed position, the threader pin 11 does not interfere with the leader block 7.

What is claimed is:

1. A magnetic tape unit comprising:
    a take-up reel for winding a magnetic tape thereon;
    a threader pin from which a leader block connected to a front end of the magnetic tape housed in a cartridge is suspended;
    a threader arm to which the threader pin is attached in order to lead the leader block from a tape exit of the cartridge up to an inside of the take-up reel by leading the threader pin from the tape exit of the cartridge up to the rotation center of the take-up reel;
    a motor for driving said threader arm; and
    an elastic body for restricting the backlash of the position of the threader arm by applying a torque which is opposed to a reactive torque of said motor to said threader arm so that the threader pin present at the rotation center of the take-up reel does not shift from the rotation center.
2. The magnetic tape unit according to claim 1, wherein the elastic force is pressure.
3. The magnetic tape unit according to claim 1, wherein the elastic force is tension.
4. The magnetic tape unit according to claim 1, wherein the elastic body is selected from the group consisting of a rubber block, a compression coil spring, a tensile coil spring, a lead spring, a torsion coil spring, and a resin block.
5. The magnetic tape unit according to claim 1, further comprising driving means for driving the threader arm.
6. A magnetic tape unit comprising:
    a take-up reel for winding a magnetic tape thereon;
    a threader pin from which a leader block connected to a front end of the magnetic tape housed in a cartridge is suspended;
    a threader arm having a first end to which the threader pin is attached in order to lead the leader block from a tape exit of the cartridge to an inside of the take-up reel by leading the threader pin from the tape exit of the cartridge to a rotation center of the take-up reel;
    a threader base to which a second end of the threader arm is rotatably connected; and
    an elastic body restricting backlash of the threader arm so that the threader pin does not shift from the rotation center, said elastic body being on said threader base and being stationary with respect to said threader arm.
7. The magnetic tape unit according to claim 6, wherein the elastic body is selected from the group consisting of a rubber block, a compression coil spring, and a resin block.
8. The magnetic tape unit according to claim 6, further comprising driving arm for driving the threader arm.
9. The magnetic tape unit according to claim 8, further comprising a motor, said threader arm being driven by said motor through said driving arm.
10. A magnetic tape unit comprising:
    a take-up reel for winding a magnetic tape thereon;
    a threader pin from which a leader block connected to a front end of the magnetic tape housed in a cartridge is suspended;
    a threader arm having a first end to which the threader pin is attached in order to lead the leader block from a tape exit of the cartridge to an inside of the take-up reel by leading the threader pin from the tape exit of the cartridge to a rotation center of the take-up reel; and
    an elastic member damping vibration of the threader arm so that the threader pin does not shift from the rotation center, said elastic body being immovable and being at a fixed position spaced apart from said take-up reel.

* * * * *